Figure 1:
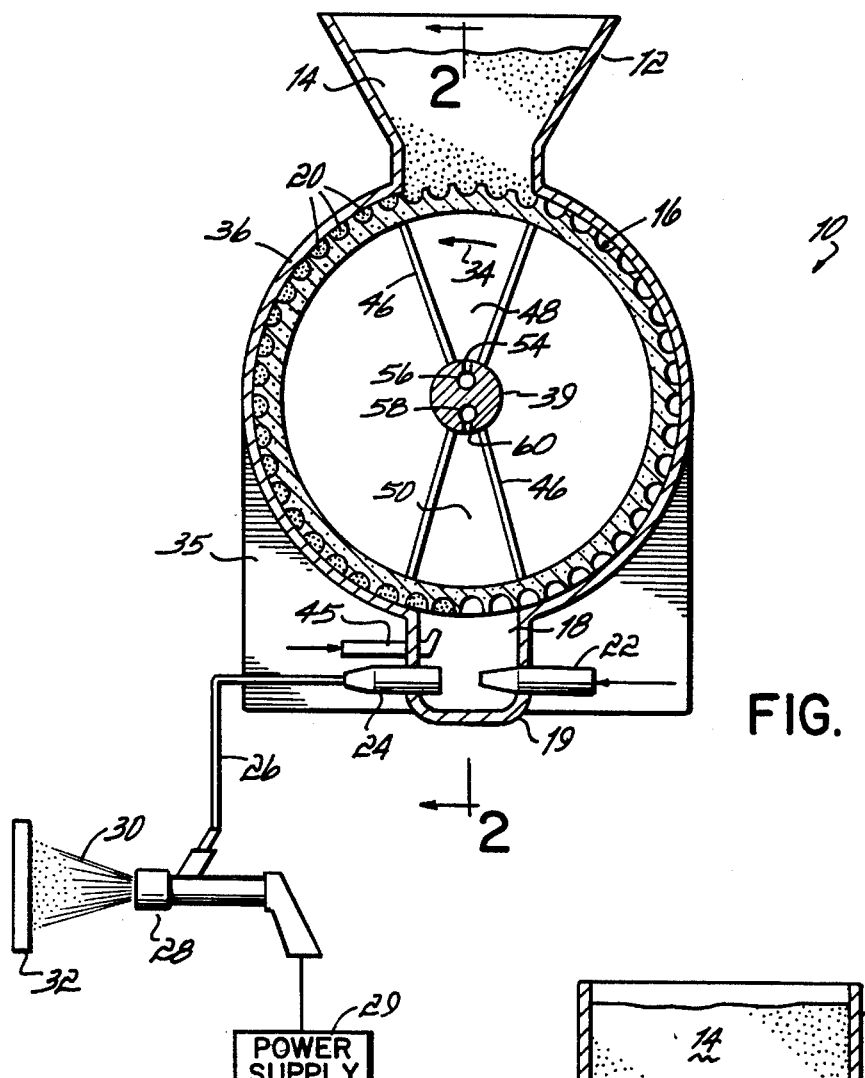

United States Patent

Matsunaga et al.

[11] Patent Number: 5,615,830
[45] Date of Patent: Apr. 1, 1997

[54] APPARATUS AND METHOD FOR SUPPLY AND TRANSPORT OF POWDER PARTICLES

[75] Inventors: Masafumi Matsunaga; Wataru Kakuta, both of Yokohama; Hikaru Saito, Tokyo, all of Japan

[73] Assignee: Nordson Corporation, Westlake, Ohio

[21] Appl. No.: 351,702

[22] Filed: Dec. 8, 1994

[30] Foreign Application Priority Data

Dec. 17, 1993 [JP] Japan .................................. 5-343874

[51] Int. Cl.⁶ ............................................... A62C 5/02
[52] U.S. Cl. .............................. 239/8; 239/705; 239/325; 222/368
[58] Field of Search .............................. 239/8, 104, 690, 239/700, 704–707, 325, 379, 654, 668; 118/308, 629, 621, 620; 406/68, 67; 222/368, 636, 637

[56] References Cited

U.S. PATENT DOCUMENTS

| 1,844,172 | 2/1932 | Moore | 406/68 |
|---|---|---|---|
| 3,714,926 | 2/1973 | Ofner | 118/603 |
| 4,165,822 | 8/1979 | Jaudt | 222/636 |
| 4,268,205 | 5/1981 | Vacca et al. | 222/368 |
| 4,302,481 | 11/1981 | Ribnitz et al. | 239/704 |
| 4,533,066 | 8/1985 | Holmes et al. | 221/211 |
| 4,770,344 | 9/1988 | Kaiser | 239/8 |
| 4,780,028 | 10/1988 | McLemore | 406/68 |
| 5,109,893 | 5/1992 | Derby | 222/368 |
| 5,213,271 | 5/1993 | Uribe et al. | 406/68 |
| 5,240,185 | 8/1993 | Kaiju et al. | 239/690 |
| 5,323,547 | 6/1994 | Kaiju et al. | 34/580 |

*Primary Examiner*—Andres Kashnikow
*Assistant Examiner*—Lisa Ann Douglas
*Attorney, Agent, or Firm*—Wood, Herron & Evans, P.L.L.

[57] ABSTRACT

An improved powder particle supply and transport apparatus and method include a hopper filled with powder particles, an ejection chamber spaced from the hopper and a movable conveying member with a plurality of cavities formed therein. During operation, the conveying member moves the cavities between the hopper and the chamber, and the cavities are filled with powder particles at the hopper and emptied of powder particles at the chamber. An ejector nozzle sprays pressurized air into the chamber toward an aligned outlet, thereby to: 1) create negative pressure in the chamber to draw powder particles from the cavities as the cavities are moved therethrough; and 2) transport powder particles through the outlet to a spray gun. Additional structure may be used to assure complete powder filling of the cavities at the hopper and/or complete powder emptying of the cavities in the chamber. The invention achieves supply and transport of uniform and stable quantities of powder particles to a spray gun, even over very small units of time, regardless of powder particle size and/or cohesive properties.

24 Claims, 2 Drawing Sheets

APPARATUS AND METHOD FOR SUPPLY AND TRANSPORT OF POWDER PARTICLES

FIELD OF THE INVENTION

This invention relates to powder coating, and more particularly, to an apparatus and method for moving uniform and stable quantities of powder particles from a powder hopper to a powder spray apparatus.

BACKGROUND OF THE INVENTION

In a typical powder coating operation, powder particles must be moved from a supply source, such as a hopper, to a powder delivery apparatus, such as a powder spray gun, from which the powder particles are sprayed toward a workpiece to be powder coated. To achieve uniformity in surface coverage on the workpiece, and thereby assure a high quality coating of powder particles, it is necessary to maintain a high level of consistency in powder quantity supplied to the spray gun, even for relatively small units of time. In short, the quality of the powder coating applied to the workpiece depends upon the ability of the entire system to move stable and uniform quantities of powder particles from the hopper to the spray gun, even for small units of time.

In some powder coating systems, the powder particles are maintained in a fluidized state while in the hopper. The fluidizing structure generally includes a gas permeable porous panel at the bottom of the hopper, and compressed gas is blown upwardly through the panel to fluidize the powder particles. This structure is referred to as a fluidized bed. With the powder particles thus maintained in a fluidized state in the hopper, a pneumatic ejector pump in fluid communication with the hopper draws the powder particles out of the hopper and transports them along a conduit to a spray gun or other powder application device.

There are several disadvantages with the use of this type of structure for powder particle supply. For instance, with the fluidized bed hopper/ejector pump combination, it is difficult to maintain the powder particles in a sufficiently fluidized state to continuously transport consistent quantities of powder particles. This is particularly true for powder particles having a relatively small diameter, such as less than ten microns. With powder particles of this size, the powder particles in the hopper generally have very poor overall fluidity and sometimes no fluidity at all. As a result, transport of the particles tends to occur in a pulsed manner. This pulsing produces inconsistencies in the quantity of powder particles transported to the spray apparatus, and subsequently, results in spraying of inconsistent powder quantities.

With powder particles having a relatively large diameter, such as up to several hundred microns, greater volumes of air are needed to maintain the powder particles in a fluidized state in the hopper. However, this increased air volume causes dispersion among the powder particles, resulting in instability, and uniformity of powder particle transport cannot be maintained.

Regardless of particle size, transporting consistent quantities of powder particles becomes increasingly more difficult for powders which have high cohesive properties.

Other powder supply equipment include a screw feeder, an auger feeder or a table feeder. However, with these other types of supply equipment, the same problems also are present, because some form of air transport equipment, such as an ejector pump, must be used in combination therewith.

Additionally, supply devices such as a screw feeder or an auger feeder produce a slight, but inherent pulsing of the supply quantity, due to the cyclical nature of the rotational movement used to perform the supply function. As a result, on the average, supply equipment of this type does produce a stable supply of powder particles over a relatively long period of time, such as several minutes or several hours. However, for very short periods of time, such as several seconds or several milliseconds, this supply equipment causes inconsistencies in the quantities of powder particles supplied.

It is an objective of this invention to improve uniformity and stability in transporting powder particles from a powder particle supply device such as a hopper to a powder spray apparatus, such as a spray gun, even over very small units of time.

It is another objective of this invention to reduce the dispersion of powder particles during transport from a powder particle supply to a powder particle spray apparatus, even over very small units of time, thereby to enhance precision in ultimate application of the powder particles to a surface.

It is still another objective of this invention to achieve uniformity and stability, over relatively small units of time, in the quantities of powder particles transported from a powder supply to a powder spray apparatus, even for powders of different particle size and/or powders having high cohesive properties.

SUMMARY OF THE INVENTION

This invention achieves the above-stated objectives by utilizing a conveying member movable between a powder holding station and a powder ejection station spaced therefrom, wherein the conveying member has a plurality of fixed size cavities formed therein which are filled with powder particles during movement through the powder holding station and emptied of powder particles during movement through the powder ejection station, with the filling and emptying occurring continuously during operation. At the powder ejection station, which is primarily a substantially enclosed chamber, an ejector nozzle sprays a stream of pressurized air toward a discharge outlet formed in the chamber. This spray causes negative pressurization in the chamber and as a result, attracts the powder particles from the cavities. This spray also causes transport of the powder particles through the outlet to a spray apparatus. Thus, the ejection air supplied by the ejector nozzle causes both removal of powder particles from the cavities at the powder ejection station and transport of the powder particles to a spray apparatus.

The filling of cavities with powder particles and the subsequent emptying thereof may continue uninterrupted, or intermittently, during a powder particle supply and transport operation. The quantity of powder particles moved from the powder holding station to the powder ejection station is directly dependent upon the speed of the conveying member, which may be readily changed to suit desired operating parameters.

The conveying member moves a known quantity of powder particles to the ejection station because the volume of the fixed size cavities occupied by powder particles is constant and known. Moreover, since this volume is constant (i.e. the total transverse cross sectional area of the cavities remains constant), the volume of powder particles supplied to the powder ejection station remains constant during operation. This is true regardless of the speed of the conveying member, because the cavities are completely filled at the powder supply station and then completely emptied at the powder ejection station.

Thus, by using powder particle filled cavities, this invention supplies uniform and stable quantities of powder particles to the powder ejection station, with no dispersion (i.e. in a substantially closed system), even over very small units of time. Additionally, during operation, pressurized air from the ejector nozzle subsequently transports these uniform and stable quantities of powder particles to a powder spray apparatus. This invention eliminates the above-described problems of instability, inconsistency and dispersion associated with the use of a fluidized bed powder supply hopper. Also, because the conveying member and the ejector nozzle operate in the same manner regardless of the size of the powder particles, this invention achieves uniformity and stability in the supply and transport of powder particles to a powder delivery apparatus, irrespective of powder particle size.

According to a first preferred embodiment of the invention, a method and apparatus for supplying powder particles to a delivery apparatus utilize a hopper, a cover substantially enclosing a chamber spaced from and located below the hopper, and a cylindrical conveying member residing between the hopper and the chamber, the conveying member having a plurality of cavities formed in its outer circumferential surface. The hopper defines a powder supply station, and the cover and chamber define a powder ejection station. The conveying member rotates about a fixed axle to continuously move the cavities between the hopper and the chamber, and back to the hopper, and so on, during powder particle supply and transport operations. An ejector nozzle mounted to the cover is aimed at a discharge outlet formed therein. Compressed ejection air from the nozzle directed toward the outlet serves the dual purpose of: 1) creating negative pressure in the chamber to attract powder particles from the cavities as the conveying member rotates powder particle filled cavities therein; and 2) transporting powder particles outwardly from the chamber via the outlet to a powder spray apparatus. This assures complete removal of powder particles from the cavities while in the chamber and ejection of the removed powder particles from the chamber via the outlet. Preferably, the dimensions of the chamber are relatively small, to maximize the negative pressurization effect and the resulting attraction of powder particles from the cavities.

A fixed cylindrical casing surrounds the cylindrical conveying member, with a very slight clearance or minimal rubbing therebetween to allow relative movement. The casing helps to contain the powder particles within the cavities during rotational movement from the hopper to the chamber. The casing also prevents overfilling of the cavities, due to the minimal clearance between the casing and the conveying member. Alternatively, the casing may be omitted, since the cohesive properties of most powders prevent them from simply falling out of the cavities prematurely, due to gravity. With the casing omitted, however, it is preferable to position some type of scraper in contact with the outer surface of the conveying member adjacent the powder holding station to prevent overfilling of the cavities.

For powder particles with highly cohesive properties, at least one cleaning nozzle is mounted to the cover, and the cleaning nozzle or nozzles is/are aimed at the conveying member. By spraying pressurized air from this nozzle toward the conveying member during rotation thereof into the chamber, complete removal of the powder particles from the cavities is assured as the cavities are moved into and through the chamber. Preferably, the flow paths of the ejector nozzle and the one or more additional nozzles do not intersect.

The invention also provides additional structure for promoting: 1) complete filling of the cavities at the powder holding station; or 2) complete emptying of the cavities at the powder ejection station, or both. More specifically, the conveying member is made of a gas permeable material. Alternatively, if the conveying member is of a solid material, permeability may be achieved by providing very small throughholes or passages extending from the bottoms of the cavities to the interior surface of the conveying member, or the cavities may actually be throughholes. For some cohesive powders, throughholes alone are sufficient.

Additionally, a pair of spaced partition boards, or dividers, extend outwardly from the fixed axle located inside the conveying member, to positions just short of the conveying member, so as to not interfere with rotation thereof. These boards define a first backside zone located opposite the hopper at the powder holding station, with the conveying member therebetween. By applying negative pressurization to this first backside zone during powder particle supply and transport operations, the low pressure behind, or radially inside of, the conveying member attracts powder particles into the cavities.

A similarly shaped, second backside zone may be utilized opposite the chamber at the powder ejection station, with the conveying member therebetween. By supplying positive pressurization to this second backside zone during powder particle supply and transport operations, the higher pressure radially inside the conveying member coupled with the negative pressurization caused by the ejector nozzle will generate an increase in the pressure differential across the conveying member. This increase in pressure differential further promotes complete removal of powder particles from the cavities as they are rotated into the chamber.

These two features may be provided independently, or simultaneously. Both features may be provided simultaneously in a cooperative fashion by routing a negative pressurization line to the first backside zone and a positive pressurization line to the second backside zone.

According to a second preferred embodiment of the invention, these same features are again provided, but with a different structural configuration. Namely, the conveying member comprises an endless belt driven by a pair of spaced drums which rotate in simultaneous fashion. Because the belt moves linearly when between the drums but arcuately when at the drums, it should be of a flexible material. The powder holding station and the powder ejection station are located next to each other, on the same horizontal level, on the upper side of the belt. With this configuration there is no need for an external casing, though the connecting structure residing between the two stations serves the purpose of preventing overfilling.

The cavities may be of any size, shape and/or spacing. However, it is preferable that the cavities have a total transverse cross sectional area which is known with respect to the movement direction of the conveying member through the chamber. Stated another way, transverse slices of equal thickness taken anywhere along the conveying member should hold a known volume of powder particles, regardless of how many cavities or cavity portions are intersected by the transverse slice. This allows quantitative measurement of powder particle quantities transported. There are also advantages arising from the fact that this known cross sectional area is constant, in that a constant known volume of powder particles may be continuously supplied and transported during operation.

With a cylindrically shaped conveying member, the invention may be implemented with uniformly sized, shaped and spaced circular cavities, or uniformly dimensioned and spaced elongated discontinuous grooves oriented diagonally to the movement direction of the conveying member, or elongated continuous grooves which completely encircle the conveying member.

In addition to a conveying member of a single material which is gas permeable, either inherently or by passages formed therein, a two component layered approach may also be used. With this layered approach, the conveying member may comprise a completely gas permeable backing layer which is then covered with a layer of solid material having openings therethrough, with the openings serving as the cavities.

With either of the two preferred structural embodiments, this invention supplies and transports uniform and stable quantities of powder particles from a powder hopper to a powder spray apparatus, even over very small units of time. This is due to the complete filling of cavities with powder particles at the powder holding station followed by complete emptying of the powder particles from the cavities at the ejection station, while the pressurized air from the ejector nozzle causes the emptied powder particles to flow outwardly from the chamber through the outlet to a powder spray apparatus, in addition to causing removal of powder particles from the cavities.

During operation, the conveying member continuously moves the cavities between the hopper and the chamber. This may be accomplished via circular movement, i.e. rotation of a cylindrical conveying member, or continuous movement via an endless belt supported on spaced rotatable rollers, or any other type of movement which circuitously moves the cavities continuously through the hopper and chamber in a relative manner.

For particularly cohesive powder one or more additional nozzles may be provided in the chamber which are directed toward the cavities to further assure complete removal of powder particles from the cavities, regardless of the degree of cohesivity.

Backside negative pressurization at the powder holding station may be used to promote complete filling of the cavities, while backside positive pressurization at the powder ejection station may be used to promote complete emptying of the cavities.

These and other features of the invention will be more readily understood in view of the following detailed description and the drawings.

BRIEF DESCRIPTION OF THE DRAWINGS

FIG. 1 is a vertical cross sectional view of a powder particle supply and transport apparatus constructed in accordance with a first preferred embodiment of the invention.

FIG. 2 is another vertical cross sectional view of the powder particle supply and transport apparatus shown in FIG. 1, taken along lines 2—2 of FIG. 1.

FIG. 3 is a vertical cross sectional view of a powder particle supply and transport apparatus constructed in accordance with a second preferred embodiment of the invention.

FIGS. 4A, 4B and 4C are perspective views of various embodiments of the conveying member shown in FIGS. 1 and 2, and FIGS. 4A, 4B and 4C illustrate principles applicable to these and various other embodiments of the invention.

FIG. 5 is a perspective cutaway view of a conveying member which may be utilized in the various embodiments of this invention.

DETAILED DESCRIPTION OF THE INVENTION

FIG. 1 shows a powder particle supply and transport apparatus 10 constructed in accordance with a first preferred embodiment of the invention. The powder supply and transport apparatus 10 includes a powder supply hopper 12 which is adapted to hold a supply of powder particles 14. The powder hopper 12 defines a powder holding station for the powder particles 14 which are to be transported from the apparatus 10. A conveying member 16 conveys the powder particles 14 from the hopper 12 to a chamber 18, which is substantially enclosed and defined by a cover 19. More specifically, the conveying member 16 carries the powder particles 14 from the hopper 12 to the chamber 18 in a plurality of cavities, or hollows 20, formed in the external surface thereof.

Together, the chamber 18 and the cover 19 define a powder ejection station for ejection of a uniform and stable quantity of powder particles 14 from the apparatus 10. More specifically, an ejector nozzle 22 is mounted to the cover 19 and is oriented in alignment with a discharge outlet 24, which is also formed in the chamber 18. The ejector nozzle 22 is in communication with a pressurized air supply (not shown), and the ejector nozzle 22 sprays pressurized air toward the discharge outlet 24 during powder supply and transport operations. This ejection air causes the powder particles 14 to be discharged from the chamber 18 through outlet 24 and into a conduit, or hose 26, which is shown schematically in FIG. 1. An opposite end of the hose 26 is connected to a powder spray apparatus 28, such as a spray gun. The gun 28 sprays the powder particles 14 in a spray pattern 30 toward an exposed surface of a workpiece 32.

If desired, the gun 28 may include additional structure such as a corona electrode (not shown operatively connected to a high voltage power supply 29 to electrostatically charge the powder particles 14 sprayed from the gun 28. Alternatively, if desired, electrostatic charging of the particles may occur internally via frictional charge inducing structure within the gun 28.

To move the powder particles 14 from the hopper 12 to the chamber 18, the conveying member 16 rotates in a direction designated by directional arrow 34. For the embodiment shown in FIGS. 1 and 2, conveying member 16 is cylindrical in shape, and thus is circular in cross section. As will be readily appreciated by those of skill in the art, particularly after reviewing FIG. 3 and the second preferred embodiment of the invention, the conveying member 16 may be configured in any one of a number of other shapes.

As shown in FIGS. 1 and 2, the hopper 12 resides vertically above the chamber 18 and the cover 19, which are supported by a base 35. This particular orientation facilitates filling of the cavities 20 with powder particles 14 at the powder holding station and removal of powder particles 14 therefrom at the powder ejection station. However, this orientation is not absolutely necessary as will be appreciated by those of skill in the art. The primary requirement for the apparatus 10 is that the conveying member 16 be suitable for moving the cavities 20 to the powder holding station in an unfilled condition for filling, then moving the cavities 20 to the powder ejection station in a filled condition for powder removal therefrom, followed by moving the cavities 20 to the powder holding station in an unfilled condition for subsequent filling, and so on, so that the powder supply and transport process may occur continuously.

During continuous powder particle supply and transport operations, the conveying member 16 continuously conveys uniform and stable quantities of powder particles 14 to the chamber 18, and the powder particles 14 are continuously ejected therefrom in uniform and stable quantities, even over small units of time. Thus, the powder particle supply and transport apparatus 10 of this invention provides uniform and stable quantities of powder particles 14 to the gun 28 for powder coating operations. Also, the apparatus 10 assures the complete filling of the cavities 20 with powder particles 14 at the powder holding station and the complete removal of the powder particles 14 therefrom at the powder ejection station.

A casing 36 which encircles the cylindrical conveying member 16 also plays a role in assuring uniform filling of the cavities 20 with powder particles 14. This is due to the sizing of the casing 36 with respect to the cylindrical conveying member 16. More particularly, the radius of curvature of these two components is the same and there is very little radial clearance or minimal frictional engagement therebetween, thereby to permit rotation of the conveying member 16 with respect to the casing 36. This prevents overfilling of the cavities at the powder holding station, or stated another way, the casing 36 affects removal of excess powder from the filled cavities 20 as the cavities 20 are moved from the hopper 12.

Figure 2:
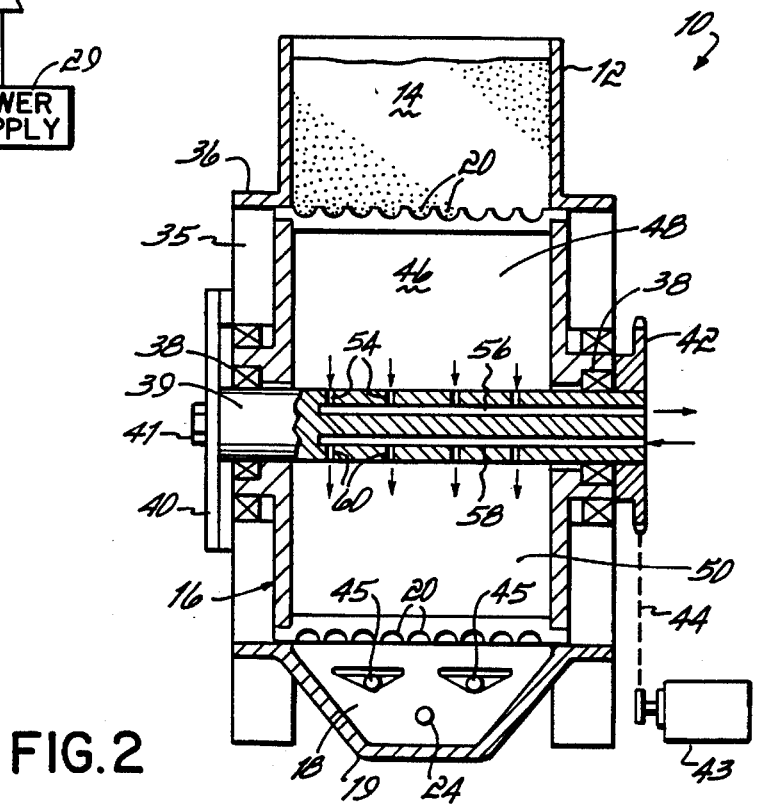

In the embodiment shown in FIGS. 1 and 2, the casing 36 is formed integrally with the hopper 12 and the cover 19. While this particular structure may provide some operational advantages, it is not critical to the invention. More particularly, the casing 36 may be eliminated entirely, and a scraper (not shown) may be mounted adjacent the external surface of the conveying member 16 to effectively remove excess powder particles 14 which protrude beyond the cavities 20. This modification is suitable for powder particles 14 having a degree of cohesivity such that they do not fall from the cavities 20 prematurely, due to gravity, upon rotation of the conveying member 16.

FIG. 2 shows the details of the structural components which permit rotation of the cylindrical conveying member 16 with respect to the hopper 12, the casing 36 and the chamber 18. More particularly, FIG. 2 shows a bearing 38 which supports the cylindrical conveying member 16 on a fixed axle 39. An end plate 40 and a bolt 41 secure the conveying member 16 in place with respect to the bearing 38 and the fixed axle 39. At the opposite end of the apparatus 10, a sprocket 42 encircles the fixed axle 39 and is connected to the conveying member 16. A motor 43 drives a chain 44 operatively connected to the sprocket 42, thereby to rotatably drive the cylindrical conveying member 16. During typical powder particle supply and transport operations, the motor 43 may drive conveying member 16 in a continuous manner at constant speed, or intermittently, or in any other desired mode.

As noted above, during powder particle supply and transport operations, the continuous movement of powder-filled cavities 20 of known volume into the chamber 18 results in continuous delivery of uniform, known quantities of powder particles 14 into chamber 18. For many powder types, complete removal of powder particles 14 from the cavities 20 while in chamber 18 results from the negative pressure created in the chamber 18 as a result of the pressurized air supplied by the ejector nozzle 22. The high pressure air from the ejector nozzle 22 into outlet 24 creates a suction effect which draws powder particles 14 from the cavities 20.

Nevertheless, for powder particles 14 which are relatively small and/or have high cohesive properties, this apparatus 10 further includes at least one cleaning nozzle 45 mounted to the cover 19 and adapted to direct a spray of pressurized air toward the conveying member 16. This pressurized air from the cleaning nozzle or nozzles 45 further assures complete removal of powder particles 14 from the cavities 20 as they move into the chamber 18 and into the spray path of this nozzle or nozzles 45. The pressurized spray expelled from cleaning nozzle 45 is supplied thereto via a pressurized air source (not shown). Thus, this apparatus 10 assures complete removal of powder particles 14 from the cavities 20 while in the chamber 18, regardless of the size and/or cohesive properties of the powder particles 14.

This powder particle supply and transport apparatus 10 further includes additional structure and features for assuring complete filling of the cavities 20 with powder particles 14 at the powder holding station and complete removal of powder particles 14 therefrom at the powder ejection station. More particularly, the apparatus 10 includes partitions 46 secured to the fixed axle 39 and extending radially outwardly therefrom, to a location adjacent the inside diameter of the conveying member 16. The partitions 46 remain fixed while the conveying member 16 rotates. The radial clearance or frictional engagement therebetween is relatively small, so as to not interfere with rotation of the conveying member 16. Adjacent the powder holding station, the partitions 46 define a first backside zone 48. This first backside zone 48 is located opposite the hopper 12 at the powder holding station, with the conveying member 16 located therebetween.

The partitions 46 also define a similarly configured second backside zone located opposite the chamber 18 at the powder ejection station, with the conveying member 16 residing therebetween.

The fixed axle 39 includes one or more suction ports 54 which open to the first backside zone 48 and communicate with suction line 56, formed in axle 39 which is best shown in FIG. 2. Similarly, a pressurized line 58 formed in fixed axle 39 communicates with one or more air jet ports 60 oriented radially in the fixed axle 39, and which open to the second backside zone 50.

The conveying member 16 is preferably made from a gas permeable material, so that the suction condition generated in the first backside zone 48 and pressurized condition generated in the second backside zone 50 will produce a desired effect on the powder particles 14 located on the opposite side of the conveying member 16 at the respective stations. More particularly, by connecting a vacuum source (not shown) to suction line 56, vacuum, or negative pressure, can be applied to the first backside zone via suction ports 54. This vacuum within first backside zone 48 creates a pressure differential across the conveying member 16 which promotes complete filling of the cavities 20 with powder particles 14.

Alternatively, exhaust line 56 may simply be vented to atmosphere, so that there is no internal pressure build up within first backside zone 48 to prevent or inhibit complete filling of the cavities 20.

In addition to the use of this negative, or reduced, pressure within first backside zone 48 during filling of the cavities 20, the apparatus 10 also provides positive pressurization in the second backside zone 50 to promote complete removal of powder particles 14 from the cavities 20 while in the powder ejection station. This positive pressurization is supplied to the second backside zone 50 via pressurized line 58 and air jet ports 60. This positive pressurization increases the pressure differential across conveying member 16 to a level above a pressure differential attributable to the negative pressure in chamber 18 created by ejector nozzle 22. This increase in the pressure differential across conveying member 16 promotes complete removal of powder particles 14 from the cavities 20.

If desired, application of negative pressurization to the first backside zone 48 and application of positive pressurization to the second backside zone 50 may be performed independently of each other, so that either one or both of these features may be used during operation of the apparatus 10. Additionally, if desired, these two features may be used simultaneously via appropriate connection of the suction line 56 and the pressurized line 58, to a vacuum/pressurization source (not shown).

In operation, with the hopper 12 filled with powder particles 14 to be sprayed from the gun 28 onto a workpiece 32, the motor 43 rotatably drives cylindrical conveying member 16 in a desired manner during a powder particle supply and transport operation. Rotation of conveying member 16 fills the unfilled cavities 20 with powder particles 14 at the powder holding station and moves the filled cavities 20 to a powder ejection station for powder removal therefrom. As powder particles 14 enter the chamber 18, negative pressurization created by the pressurized air jet discharged from the ejector nozzle 22 causes the powder particles 14 to be drawn from the cavities 20, and this air jet also causes subsequent ejection of the particles 14 from the chamber 18 through the discharge outlet 24. The conveying member 16 then moves the emptied cavities 20 back to the powder holding station for subsequent powder filling, with the process continuing so long as the powder particle supply and transport operation to the gun 28 continues.

For powder particles 14 which are highly cohesive, one or more additional pressurized air jets may be supplied by one or more second nozzles 45 directed at the conveying member 16 within the chamber 18, thereby to assure removal of powder particles 14 from the cavities 20 during rotational movement into the chamber 18. This provides uniformity and stability in the supply of known quantities of powder particles 14 from the hopper 12 to the chamber 18 and uniformity and stability in the ejective transport of known quantities of powder particles 14 from the chamber 14, thereby to promote uniformity and consistency in coating operations.

The size of the conveying member 16 with respect to the external casing 36, or other scraper, prevents excess filling of the cavities 20 while at the powder holding station. Thus, the cavities 20 are filled to the same level during operation.

Additionally, by using a conveying member 16 which is gas permeable, negative pressurization applied to the first backside zone 48 at the powder holding station creates a pressure differential across the conveying member 16 which promotes complete and uniform filling of powder particles 14 into the cavities 20.

Additionally, and/or alternatively, positive pressurization applied to the second backside zone 50 at the powder ejection station promotes complete removal, or emptying, of powder particles 14 from the cavities 20.

Figure 3:
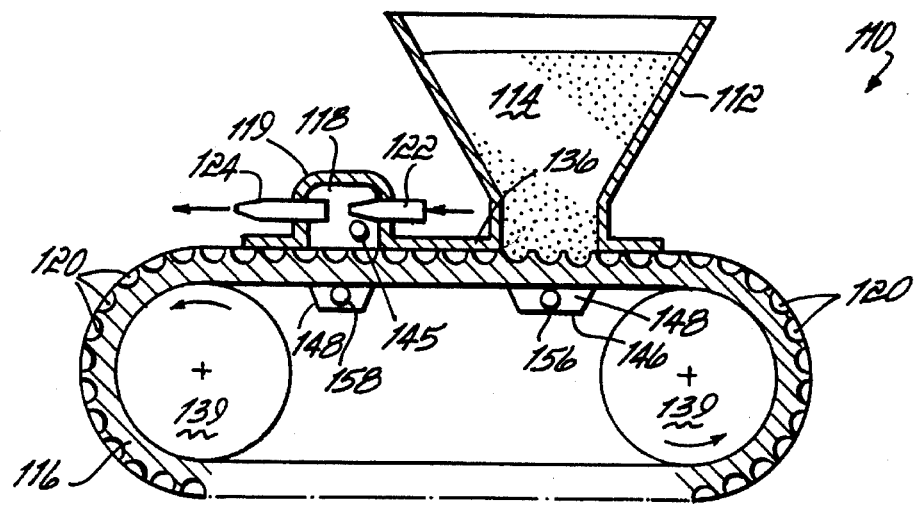

FIG. 3 shows a powder particle supply and transport apparatus 110 constructed in accordance with a second preferred embodiment of the invention. The variations of the invention shown in FIG. 3 exemplify the degree of variation to which the structure of this invention is susceptible. The powder delivery system 110 shown in FIG. 3 also provides stability and uniformity in the supply and transport of powder particles 114 to a powder delivery apparatus (not shown), and it includes all of the same features as the first preferred embodiment, but the structural components are arranged in a slightly different configuration.

More specifically, in powder particle supply and transport apparatus 110, the hopper 112 holds powder particles 114 and defines a powder holding station. A conveying member 116 conveys the powder particles 114 to a chamber 118 formed within a cover 119 to provide a powder ejection station. As in the first preferred embodiment, this apparatus 110 utilizes cavities 120 in the conveying member 116 for moving the powder particles 114 between the powder holding station and the powder ejection station.

In this embodiment, the conveying member 116 is in the form of a flexible endless belt, and is movable via simultaneous rotation of a pair of spaced rotating drums 139. The hopper 112 and the chamber 118 are oriented in the same horizontal plane, and located next to each other. Preferably, they reside above the belt 116. These two components may actually be formed as one integral piece, if desired. A midsection 136 residing therebetween performs the same function as the external casing 36 in the first embodiment. That is, the midsection 136 removes excess powder particles 114 from the cavities 120 to prevent overfilling.

At the powder ejection chamber 118, an ejector nozzle 122 is mounted and aimed toward a discharge outlet 124. Again, as in the first embodiment, negative pressurization produced by directing an air jet from ejector nozzle 122 into outlet 124 causes: 1) emptying of powder particles 114 from the cavities 120 when the conveying member 116 moves the cavities 120 into the chamber 118; and 2) ejection of the powder particles 14 through the outlet 124.

Additionally, for powder particles 114 with relatively high cohesive properties, one or more cleaning nozzles 145 may be directed toward the conveying member 116, to spray a pressurized air stream toward the cavities 120 as they move into the chamber 118, thereby to further assure removal of powder particles 114 therefrom.

As in the first embodiment, the conveying member 116 is preferably gas permeable so that negative pressurization may be used in a first backside zone 148 located opposite the hopper 112 at the powder holding station, with the conveying member 116 residing therebetween. This negative pressurization is applied to the first backside zone 148 via a suction line 156.

Additionally, and/or alternatively, positive pressurization may be supplied to a second backside zone 150 located opposite the chamber 118 at the powder ejection station, with the conveying member 116 residing therebetween. This positive pressurization may be supplied to the second backside zone 150 via pressurized line 158.

Again, as in the first embodiment, negative pressurization in the first backside zone 148 and positive pressurization in the second backside zone 150 may be utilized independently, or simultaneously.

The powder particle supply and transport apparatus 110 shown in FIG. 3 operates in a manner similar to the first preferred embodiment. The conveying member 116 moves via simultaneous rotation of the drums 139 to supply powder particles 114 from the powder holding station to the powder ejection station in uniform, stable and known quantities with little or no dispersion, even over very small periods of time. Also, the conditions in chamber 118 caused by the pressurized air jet from ejector nozzle 122 result in removal of the powder particles 114 from the cavities 120 and transport in uniform, stable and known quantities, to a spray gun (not shown).

Figure 4A:
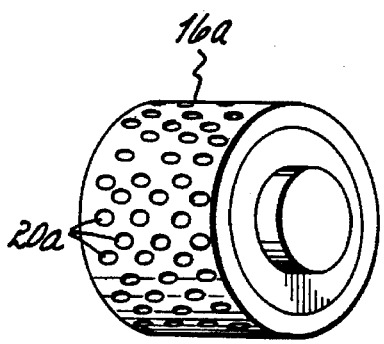
Figure 4B:
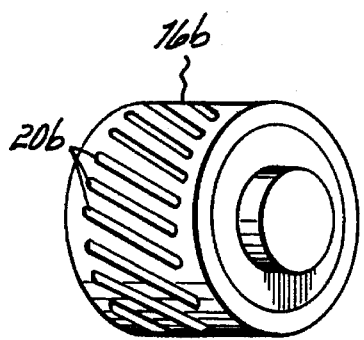
Figure 4C:
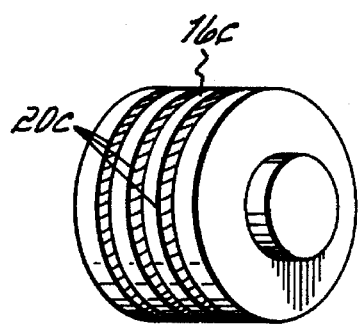
Figure 5:
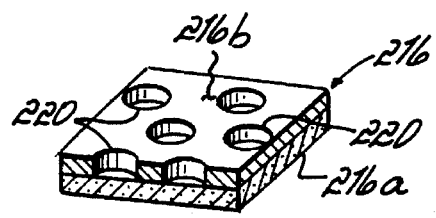

FIGS. 4A, 4B and 4C show various alternative constructions for the cavities 20 of a cylindrically-shaped conveying member 16. FIG. 4A shows a plurality of uniformly spaced and uniformly distributed cavities **20*a*** having a round shape.

FIG. 4B shows a cylindrical conveying member **16*b* having a plurality of cavities 20*b* which comprise elongated, discontinuous grooves, with the grooves oriented diagonally with respect to the movement direction of the conveying member 16*b* into the chamber 18. With these cavities 20*b*, filling and removing of powder particles 14 occurs over a longer period of time, determined by the amount of time it takes for the conveying member 16*b* to rotate the leading edge and then the trailing edge of the cavities 20*b*** into and then out of the respective stations.

FIG. 4C shows a cylindrical conveying member **16*c* with three cavities 20*c* which comprise elongated, continuous grooves which completely encircle the conveying member 16*c*. With the cavities 20*c* completely encircling the conveying member 16*c*, each cavity 20*c*** is continuously filled and emptied.

While FIGS. 4A, 4B and 4C illustrate the principles of various shapes of cavities 20 for a cylindrical member 16, i.e. round, elongated and discontinuous, and elongated and continuous, it is to be understood that these types of cavities 20 may also be utilized with the flexible, endless belt conveying member 116 shown in FIG. 3, or with other configurations or shapes of a conveying member to which the principles of this invention may be applicable.

FIG. 5 illustrates an alternative approach to the structure of the conveying member, and this approach may also be applied to any one of the various embodiments of this invention. More particularly, this approach utilizes a conveying member 216 of two-part construction, with a base, or backing layer **216*a* of a gas permeable material layered with a layer of solid material 216*b* having throughholes 220 formed or machined therein. When layered onto base 216*a*, these throughholes 220 become the cavities 220. Again, the cavities 220 may be of any desired shape, as illustrated by FIGS. 4A, 4B and 4C**.

This example also illustrates that the conveying member may simply have throughholes formed therein, rather than closed bottom cavities, by simply using layer **216*b***. This approach is suitable for highly cohesive powders.

While two preferred embodiments of a powder particle supply and transport apparatus constructed in accordance with this invention have been described, and various alternative approaches to components of this structure have also been described, it is to be understood that the invention is not limited thereby and that in light of the present disclosure various other alternative embodiments will be apparent to one of ordinary skill in the art without departing from the scope of the invention. Accordingly, applicants intend to be bound only by the following claims.

We claim:

1. A powder supply and transport apparatus comprising:

a powder holding station for holding powder particles;

a powder ejection station spaced from the powder holding station;

a conveyor transporting powder particles from the powder holding station to the powder election station during operation, the conveyor including a conveying member movable relative to the powder holding station and the powder ejection station; and the conveying member having a plurality of cavities formed therein, the conveying member adapted to be moved relatively, during operation, between the powder holding station, where the cavities are filled with powder particles, and the powder ejection station where the powder particles are emptied from the cavities, wherein each of the cavities comprises a continuous groove.

2. A powder supply and transport apparatus comprising:

a powder holding station for holding powder particles;

a powder ejection station spaced from the powder holding station;

a conveyor transporting powder particles from the powder holding station to the powder ejection station during operation, the conveyor including a conveying member movable relative to the powder holding station and the powder ejection station; and the conveying member having a plurality of cavities formed therein, the conveying member adapted to be moved relatively, during operation, between the powder holding station, where the cavities are filled with powder particles, and the powder ejection station where the powder particles are emptied from the cavities, wherein the conveying member further comprises:

a gas permeable backing; and a solid material with a plurality of throughholes formed therethrough and layered adjacent the backing, the throughholes defining the cavities.

3. The apparatus of claim 2 and further comprising:

a casing substantially surrounding the conveying member and the cavities.

4. The apparatus of claim 2 wherein the conveying member is cylindrical in shape, the powder holding station and the powder ejection station are located adjacent a circumference of the cylindrical conveying member, and the conveyor rotates the conveying member between the powder holding station and the powder ejection station during operation.

5. The apparatus of claim 4 wherein the powder holding station is located vertically above the powder ejection station.

6. The apparatus of claim 2 wherein each of the cavities is round in shape.

7. The apparatus of claim 2 wherein each of the cavities comprises an elongated discontinuous groove.

8. A powder supply and transport apparatus comprising:

a powder holding station for holding powder particles;

a powder ejection station spaced from the powder holding station;

a conveyor transporting powder particles from the powder holding station to the powder ejection station during operation, the conveyor including a conveying member movable relative to the powder holding station and the powder election station; and the conveying member having a plurality of cavities formed therein, the conveying member adapted to be moved relatively, during operation, between the powder holding station, where the cavities are filled with powder particles and the powder ejection station where the powder particles are emptied from the cavities, wherein the conveying member is gas permeable and further comprising:

means for applying negative pressurization to a first backside zone located opposite the powder holding station, with the conveying member therebetween, thereby to create a pressure differential across the conveying member to promote filling of the cavities at the powder holding station.

9. A powder supply and transport apparatus comprising:

a powder holding station for holding powder particles;

a powder ejection station spaced from the powder holding station;

a conveyor transporting powder particles from the powder holding station to the powder ejection station during operation, the conveyor including a conveying member movable relative to the powder holding station and the powder ejection station; and the conveying member having a plurality of cavities formed therein, the conveying member adapted to be moved relatively, during operation, between the powder holding station, where the cavities are filled with powder particles, and the powder ejection station where the powder particles are emptied from the cavities, wherein the conveying member is gas permeable and further comprising:

means for applying positive pressurization to a second backside zone located opposite the powder ejection station, with the conveying member therebetween, thereby to create a pressure differential across the conveying member to promote emptying of the cavities at the powder ejection station.

10. The apparatus of claim 9 and further comprising:

a conduit having a first end in fluid communication with the discharge outlet for receiving particles ejected therethrough; and a powder particle spray gun connected to a second end of the conduit and adapted to receive the powder particles from the conduit and spray the powder particles in a desired direction.

11. The apparatus of claim 9 and further comprising:

an ejector nozzle located in the powder ejection station and a discharge outlet formed in the ejection station, the ejector nozzle adapted to spray pressurized air toward the outlet during operation to transport powder particles from the powder ejection station through the discharge outlet.

12. The apparatus of claim 11 wherein the powder ejection station further comprises:

a cover defining a substantially enclosed chamber into which the conveying member moves the powder-filled cavities for powder particle emptying therefrom during operation, the ejector nozzle mounted to the chamber in alignment with the discharge outlet.

13. The apparatus of claim 2 and further comprising:

a cleaning nozzle mounted within the chamber and aimed toward the conveying member, the cleaning nozzle adapted to spray pressurized air toward the conveying member to further promote emptying of the powder particles from the cavities as the cavities move through the chamber.

14. A powder supply and transport apparatus comprising:

a hopper for holding a supply of powder particles, the hopper including an open bottom end;

a cover spaced from the hopper and defining a substantially enclosed chamber, the cover having a discharge outlet;

a cylindrical conveying member located between the hopper and the chamber, the conveying member having a plurality of cavities formed in an external surface thereof;

a drive rotating the conveying member to move the cavities past the open bottom end of the hopper to fill the cavities with powder particles, and to subsequently move the cavities into the chamber;

a nozzle directing a pressurized air jet into the chamber and toward the outlet, to transport powder particles from the chamber through the outlet, wherein the conveying member is gas permeable and further comprising:

a fixed axle residing within the cylindrical conveying member and aligned along an axis of rotation thereof;

a pair of spaced partitions extending radially outwardly from the axle toward the conveying member in the direction of the hopper to define a first zone bounded by the axle, the conveying member and the partitions; and means for applying negative pressurization to the first zone to create a pressure differential across the conveying member from the hopper to the first zone, thereby to promote filling of the cavities with powder particles.

15. The powder supply and transport apparatus of claim 14 and further comprising:

a cleaning nozzle mounted within the cover and aimed at the conveying member, the cleaning nozzle adapted to spray pressurized air toward the conveying member to further promote removal of powder particles from the cavities as the conveying member rotatably moves the cavities through the chamber.

16. A powder supply and transport apparatus comprising:

a hopper for holding a supply of powder particles, the hopper including an open bottom end;

a cover spaced from the hopper and defining a substantially enclosed chamber, the cover having a discharge outlet;

a cylindrical conveying member located between the hopper and the chamber, the conveying member having a plurality of cavities formed in an external surface thereof;

a drive rotating the conveying member to move the cavities past the open bottom end of the hopper to fill the cavities with powder particles, and to subsequently move the cavities into the chamber;

a nozzle directing a pressurized air jet into the chamber and toward the outlet, to transport powder particles from the chamber through the outlet, wherein the conveying member is gas permeable and further comprising:

a fixed axle residing within the cylindrical conveying member and aligned along an axis of rotation thereof;

a pair of spaced partitions extending radially outwardly from the axle toward the conveying member in the direction of the chamber to define a second zone bounded by the axle, the conveying member and the partitions; and means for applying positive pressurization to the second zone to create a pressure differential across the conveying member from the second zone to the chamber, thereby to promote emptying of the powder particles from the cavities.

17. A method of supplying and transporting powder particles comprising the steps of:

filling, at a powder holding station, powder particles into cavities in a conveying member;

moving, in a relative manner, the conveying member through the powder holding station during the filling step, and then into and through an ejection chamber spaced from the powder holding station, the ejection chamber having an ejector nozzle and a discharge outlet located therein; and spraying pressurized air from the ejector nozzle toward the discharge outlet as the conveying member moves the cavities through the chamber, to transport powder particles from the chamber through the discharge outlet, wherein the conveying member is gas permeable and further comprising the step of:

creating, during the filling step, a pressure drop across the conveying member from the powder holding station to a first zone located opposite the powder holding station, with the conveying member therebetween, thereby to promote filling of the cavities with powder particles.

18. A method of supplying and transporting powder particles comprising the steps of:

filling, at a powder holding station, powder particles into cavities in a conveying member;

moving, in a relative manner, the conveying member through the powder holding station during the filling step, and then into and through an ejection chamber spaced from the powder holding station, the ejection chamber having an ejector nozzle and a discharge outlet located therein;

spraying pressurized air from the ejector nozzle toward the discharge outlet as the conveying member moves the cavities through the chamber, to transport powder particles from the chamber through the discharge outlet, wherein the conveying member is gas permeable and further comprising the step of:

creating, during the spraying step, a pressure rise across the conveying member from a second zone located opposite the chamber to the chamber, with the conveying member therebetween, thereby to promote emptying of the powder particles from the cavities.

19. The method of claim 18 and further comprising the step of:

moving the cavities back to the powder holding station for refilling, and continuing to move the conveying member and the cavities between the powder holding station and the chamber during a powder particle supply and transport operation, while also continuing to perform the filling and spraying steps.

20. The method of claim 18 and further comprising the step of:

conveying the powder particles from the outlet to a powder application device.

21. The method of claim 18 wherein the conveying member is cylindrical in shape and is moved by rotation.

22. The method of claim 18 wherein the chamber has a cleaning nozzle located therein and aimed at the conveying member, and further comprising the step of:

spraying air from the cleaning nozzle toward the conveying member as the conveying member moves the cavities through the chamber, thereby to assure emptying of powder particles from the cavities during movement through the chamber.

23. The method of claim 18 and further comprising the step of:

removing from the conveying member powder particles which protrude beyond the cavities.

24. The method of claim 18 wherein the conveying member moves in one of the following modes:

intermittently and continuously.

* * * * *

UNITED STATES PATENT AND TRADEMARK OFFICE
CERTIFICATE OF CORRECTION

PATENT NO. : 5,615,830
DATED : April 1, 1997
INVENTOR(S) : Masafumi Matsunaga, Wataru Kakuta and Hikaru Saito It is certified that error appears in the above-indentified patent and that said Letters Patent is hereby corrected as shown below:

Column 11, line 67, "election" should read --ejection--

Column 12, line 59, "election" should read --ejection--

Signed and Sealed this

Ninth Day of September, 1997

Attest:

BRUCE LEHMAN

Attesting Officer

Commissioner of Patents and Trademarks